US010259189B2

(12) United States Patent
Chiang et al.

(10) Patent No.: US 10,259,189 B2
(45) Date of Patent: Apr. 16, 2019

(54) METAL-AND-RESIN COMPOSITE AND METHOD FOR MAKING THE SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Chwan-Hwa Chiang, New Taipei (TW); Bao-Shen Zhang, Shenzhen (CN); Chieh-Hsiang Wang, New Taipei (TW)

(73) Assignees: SHENZHEN FUTAIHONG PRECISION INDUSTRY CO, Shenzhen (CN); FIH (HONG KONG) LIMITED, Kowloon (HK)

( * ) Notice: Subject to any disclaimer, the term of this patent is extended or adjusted under 35 U.S.C. 154(b) by 484 days.

(21) Appl. No.: 14/610,154

(22) Filed: Jan. 30, 2015

(65) Prior Publication Data

US 2016/0159029 A1    Jun. 9, 2016

(30) Foreign Application Priority Data

Dec. 9, 2014    (CN) .......................... 2014 1 0741693

(51) Int. Cl.
*B32B 3/26*    (2006.01)
*B32B 15/04*    (2006.01)
(Continued)

(52) U.S. Cl.
CPC ............... *B32B 3/26* (2013.01); *B29C 45/00* (2013.01); *B29C 45/14311* (2013.01); *B32B 15/04* (2013.01); *B32B 27/06* (2013.01); *B32B 27/285* (2013.01); *B29C 2045/14868* (2013.01); *B32B 15/08* (2013.01); *B32B 15/09* (2013.01); *B32B 15/18* (2013.01); *B32B 15/20* (2013.01); *B32B 27/286* (2013.01); *B32B 27/288* (2013.01); *B32B 27/304* (2013.01); *B32B 27/36* (2013.01); *B32B 27/365* (2013.01);
(Continued)

(58) Field of Classification Search
CPC ..................... Y10T 428/24996; B32B 15/08
See application file for complete search history.

(56) References Cited

U.S. PATENT DOCUMENTS 5,958,578 A * 9/1999 Blohowiak ............ B05D 3/102
428/336
6,238,783 B1 * 5/2001 Komai ..................... B05D 7/51
428/307.3

(Continued)

FOREIGN PATENT DOCUMENTS

CN        103448202 A    12/2013

OTHER PUBLICATIONS

Royal Society of Chemistry, "Periodic Table Chromium", 2016, p. 1. Accessed at http://www.rsc.org/periodic-table/element/24/chromium.*

*Primary Examiner* — Mark Ruthkosky
*Assistant Examiner* — Julia L Rummel
(74) *Attorney, Agent, or Firm* — ScienBiziP, P.C.

(57) ABSTRACT

A metal-and-resin composite includes a metal substrate having a plurality of nano pores, an intermediate layer formed on the metal substrate, and a resin member. The intermediate layer fills at least portion of each nano pore. The resin member covers and bonds with the intermediate layer, thus to bond with the metal substrate.

5 Claims, 3 Drawing Sheets

(51) Int. Cl.
  *B32B 27/06* (2006.01)
  *B32B 27/28* (2006.01)
  *B29C 45/00* (2006.01)
  *B29C 45/14* (2006.01)
  *B32B 27/36* (2006.01)
  *B32B 27/30* (2006.01)
  *B32B 15/08* (2006.01)
  *B32B 15/09* (2006.01)
  *B32B 15/18* (2006.01)
  *B32B 15/20* (2006.01)

(52) U.S. Cl.
  CPC ....... *B32B 2250/02* (2013.01); *B32B 2255/06* (2013.01); *B32B 2255/20* (2013.01); *B32B 2310/00* (2013.01); *B32B 2311/18* (2013.01); *B32B 2311/20* (2013.01); *B32B 2311/24* (2013.01); *B32B 2311/30* (2013.01); *B32B 2327/06* (2013.01); *B32B 2367/00* (2013.01); *B32B 2369/00* (2013.01); *B32B 2371/00* (2013.01); *B32B 2509/00* (2013.01); *B32B 2605/08* (2013.01); *Y10T 428/24996* (2015.04)

(56) References Cited

U.S. PATENT DOCUMENTS

2005/0175798 A1\* 8/2005 Kurokawa ............... C09D 5/28
                                                         428/34.1
2012/0043689 A1\* 2/2012 Chang ............... B29C 45/14311
                                                         264/154

\* cited by examiner

METAL-AND-RESIN COMPOSITE AND METHOD FOR MAKING THE SAME

FIELD

The present disclosure generally relates to a metal-and-resin composite and a method for making the metal-and-resin composite.

BACKGROUND

Metal-and-resin composites are used in a wide range of industrial fields including the production of parts for automobiles, domestic appliances, industrial machinery, and the like. Generally, metal and resin are joined together by an adhesive. However, this method cannot supply a high strength composite of metal and resin. There is a need to combine metal and resin together.

BRIEF DESCRIPTION OF THE FIGURES

Implementations of the present technology will now be described, by way of example only, with reference to the attached figures.

DETAILED DESCRIPTION

Figure 1:
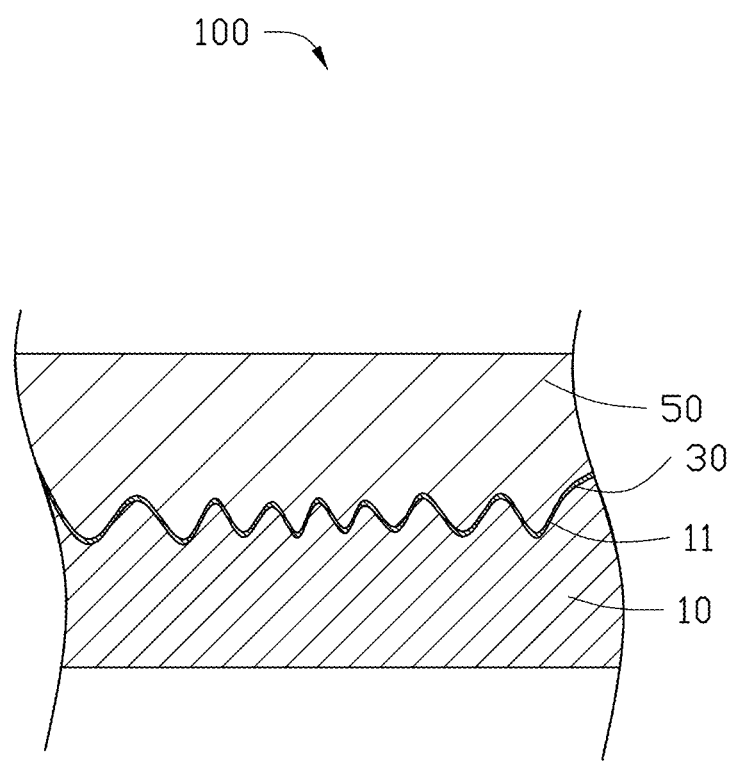
FIG. 1 is a cross-sectional view of an exemplary embodiment of a metal-and-resin composite.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

FIG. 1 illustrates a metal-and-resin composite 100 according to an exemplary embodiment. The composite 100 includes a metal substrate 10, an intermediate layer 30 formed on the metal substrate 10, and a resin member 50 covering the intermediate layer 30, to bond with the metal substrate 10.

The metal substrate 10 can be made of stainless steel, aluminum alloy, titanium alloy, aluminum-magnesium alloy, or zinc alloy. The metal substrate 10 has a plurality of nano pores 11 through a chemical etching process. The nano pores 11 have a diameter of about 10 nm to about 1000 nm, and a depth of about 0.1 μm to about 20 μm.

The intermediate layer 30 comprises coupling agent. The coupling agent can be a titanate coupling agent, a zirconate coupling agent, a silane coupling agent, a boric acid ester coupling agent, or a sulfonic acid coupling agent. The intermediate layer 30 fills at least a portion of each nano pore 11 and covers the metal substrate 10. The intermediate layer 30 has a thickness of about 0.5 nm to about 10 nm. In at least one exemplary embodiment, a portion of each nano pore 11 is unfilled with the intermediate layer 30.

An energy dispersive spectroscopy (EDS) test indicates that surfaces of the intermediate layer 30 includes carbon having a mass percentage of about 2.58-2.87%, oxygen having a mass percentage of about 1.29-2.08%, silicon having a mass percentage of about 0.59-0.72%, chromium having a mass percentage of about 17.78-18.08%, manganese having a mass percentage of about 0.66-0.75%, iron having a mass percentage of about 67.73-69.23%, and nickel having a mass of about 7.79-7.88%.

A scanning electron microscope (SEM) test indicates that the intermediate layer 30 covers the metal substrate 10, and fills at least portion of each nano pore 11, a portion of each nano pore 11 is unfilled with the intermediate layer 30. The portion of each nano pore 11 unfilled with the intermediate layer 30 has a diameter of about 10 nm to about 990 nm.

The resin member 50 can cover and bond with the intermediate layer 30, and fill the portion of each nano pore 11 unfilled with the intermediate layer 30, such to bond with the metal substrate 10.

The resin member 50 can be made of polybutylene terephthalate (PBT), polyphenylene sulfide (PPS), polyethylene terephthalate (PET), polyetheretherketone (PEEK), polycarbonate (PC), or polyvinyl chloride (PVC). The bond between the resin member 50 and the intermediate layer 30 includes chemical bonds, such that the resin member 50 can bond with the metal substrate 10 through the chemical bonds. The tensile strength of the composite 100 is about 10 $KgF/cm^2$ to about 100 $KgF/cm^2$, and the shear strength of the composite 100 is about 10 $KgF/cm^2$ to about 260 $KgF/cm^2$.

Figure 2:
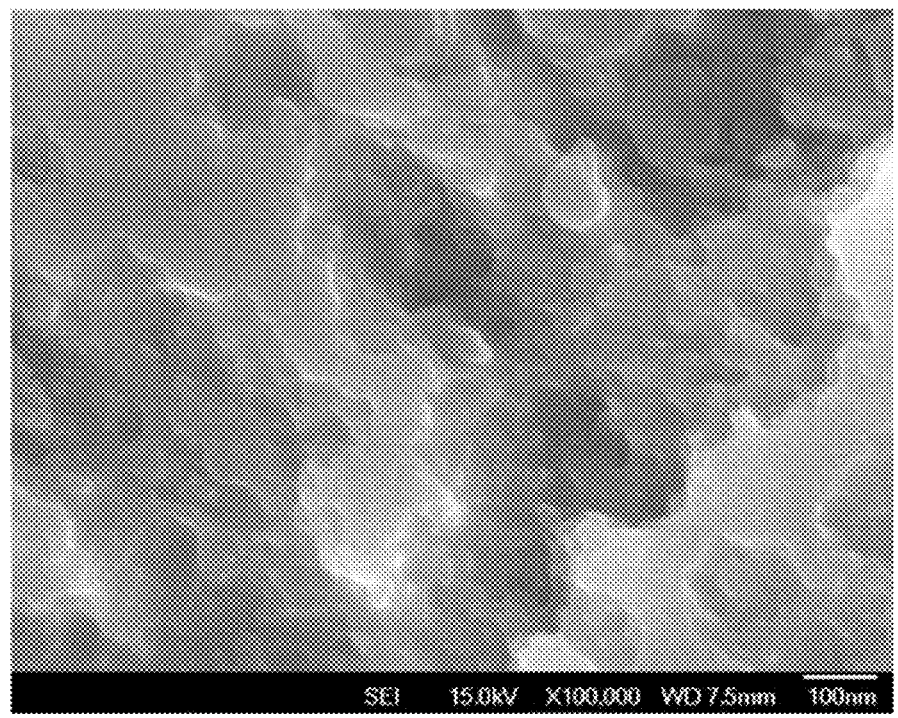
FIG. 2 is a scanning electron microscope (SEM) image of a metal substrate having an intermediate layer.
Figure 3:
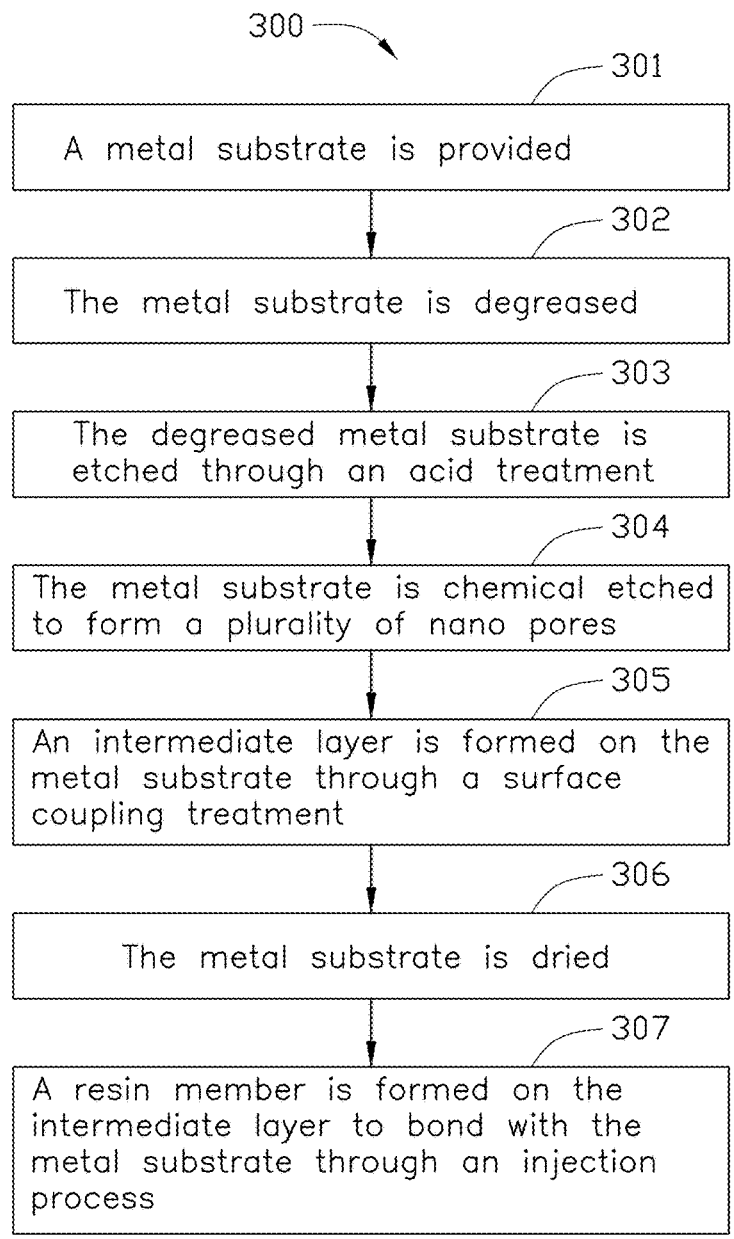
FIG. 3 is a flow chart of a method for making a metal-and-resin composite in accordance with an exemplary embodiment.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-2, for example, and various elements of these figures are referenced in explaining method 300. Each block shown in FIG. 3 represents one or more processes, methods or subroutines, carried out in the example method 300. Furthermore, the order of blocks is illustrative only and the order of the blocks can change according to the present disclosure. Additional blocks can be added or fewer blocks can be utilized, without departing from this disclosure. The example method 300 can begin at block 301.

At block 301, a metal substrate 10 is provided. The metal substrate 10 can be made of stainless steel, aluminum alloy, titanium alloy, aluminum-magnesium alloy, or zinc alloy.

At block 302, the metal substrate 10 is degreased by dipping the metal substrate 10 into a metal degreaser solution having a concentration of about 5-20 g/L. The dipping process can last for about 3 minutes to about 10 minutes. The temperature of the degreaser solution can be about 40° C. to about 75° C. In at least one exemplary embodiment, the degreaser solution can be a conventional degreaser solution.

At block 303, the degreased metal substrate 10 is then etched through an acid treatment to remove a metal oxide film which may naturally form on the metal substrate 10 when the metal substrate 10 is exposed to air. This acid treatment can be carried out by dipping the metal substrate 10 in an acid solution for about 0.5 minutes to about 5 minutes. The acid solution can have a temperature of about 50° C. to about 60° C., and a concentration of about 5-20 g/L. The acid solution can be selected from at least one of a group consisting of hydrochloric acid, phosphoric acid, sulphuric acid, nitric acid and hydrofluoric acid. It is to be understood that the metal substrate 10 has not been etched during the acid treatment. The metal substrate 10 is then cleaned to remove etch-resulting impurities.

At block 304, the metal substrate 10 is chemical etched to form a plurality of nano pores 11 on a surface of the metal substrate 10. The chemical etching can be carried out by dipping the metal substrate 10 into a chemical etching solution at a temperature of about 10° C. to about 120° C. The chemical etching process can last for about 1 minute to about 120 minutes. The chemical etching solution can be a sulphuric acid solution having a concentration of about 100-980 ml/L. The nano pores 11 have a diameter of about 10 nm to about 1000 nm, and a depth of about 0.1 µm to about 20 µm.

At block 305, an intermediate layer 30 is formed on the metal substrate 10 and filled at least portion of each nano pore 11 through a surface coupling treatment. The intermediate layer 30 has a thickness of about 0.5 nm to about 10 nm. The surface coupling treatment can be carried out by dipping the metal substrate 10 into a coupling solution at a temperature of about 25° C. to about 100° C. The surface coupling treatment can last for 1 second to about 5 minutes. The coupling solution can include solvent and coupling agent having a concentration of about 10 ml/L to about 100 ml/L. The coupling agent can be a titanate coupling agent, a zirconate coupling agent, a silane compound coupling agent, a boric acid ester coupling agent, or a sulfonic acid coupling agent. The solvent can be water or methanol. The intermediate layer 30 has a thickness of about 0.5 nm to about 10 nm. In at least one exemplary embodiment, a portion of each nano pore 11 is unfilled with the intermediate layer 30.

At block 306, the metal substrate 10 is dried at a temperature of about 25° C. to about 140° C. The metal substrate 10 can be dried naturally, or dried in an oven.

An energy dispersive spectroscopy (EDS) test indicates that a surface of the intermediate layer 30 formed in EXAMPLE 3 includes carbon having a mass percentage of about 2.58-2.87%, oxygen having a mass percentage of about 1.29-2.08%, silicon having a mass percentage of about 0.59-0.72%, chromium having a mass percentage of about 17.78-18.08%, manganese having a mass percentage of about 0.66-0.75%, iron having a mass percentage of about 67.73-69.23%, and nickel having a mass of about 7.79-7.88%.

A scanning electron microscope (SEM) test indicates that the intermediate layer 30 covers the metal substrate 10, and fills at least portion of each nano pore 11, a portion of each nano pore 11 is unfilled with the intermediate layer 30. The portion of each nano pore 11 unfilled with the intermediate layer 30 has a diameter of about 10 nm to about 990 nm.

At block 307, a resin member 50 is formed on the intermediate layer 30 to bond with the metal substrate 10 through an injection process. The injection process can be carried out by placing the metal substrate 10 into an injection mold (not shown), and molten resin is injected into the mold, and covers and bonds a surface of the intermediate layer 30 and fills the portion of each nano pore 11 unfilled with the intermediate layer 30, forming the resin member 50. The composite 100 is thus formed. During the injection process, the molten resin is kept at a temperature of about 220° C. to about 320° C. The resin member 40 can be made of polybutylene terephthalate (PBT), polyphenylene sulfide (PPS), polyethylene terephthalate (PET), polyetheretherketone (PEEK), polycarbonate (PC), or polyvinyl chloride (PVC). The bond between the resin member 50 and the intermediate layer 30 includes chemical bondings, such the resin member 50 can bond with the metal substrate 10 through the chemical bondings. The tensile strength of the composite 100 is about 10 KgF/cm$^2$ to about 100 KgF/cm$^2$, and the shear strength of the composite 100 is about 10 KgF/cm$^2$ to about 260 KgF/cm$^2$.

EXAMPLE 1

In this example, the metal substrate 10 was made of stainless steel SUS304, and the resin member 50 was made of PBT.

The metal substrate 10 was degreased by dipping in a degreaser solution having a concentration of 20 g/L and a temperature of 75° C., allowing the metal substrate 10 to be ultrasonically cleaned, for 5 min.

The degreased metal substrate 10 was etched by dipping in a hydrochloric acid solution having a concentration of 200 g/L and a temperature of 50° C., allowing the metal substrate 10 to be etched for 0.5 min.

The etched metal substrate 10 was chemical etched by dipping in a sulphuric acid solution having a concentration of 300 ml/L and a temperature of 70° C., allowing the metal substrate 10 to be chemical etched for 10 min.

The chemical etched metal substrate 10 was surface coupling treated by dipping in a coupling solution having a temperature of 25° C., allowing the metal substrate 10 to be surface coupling treated for 10 seconds to form an intermediate layer 30 on the metal substrate 10. The coupling solution includes methanol and zirconate coupling agent having a concentration of 30 ml/L.

The metal substrate 10 was dried in an oven having an interior temperature of 60° C. for 15 min.

Molten PBT resin having a temperature of 285° C. was injected to a surface of intermediate layer 30, and finally formed the resin member 50.

EXAMPLE 2

In this example, the metal substrate 10 was made of stainless steel SUS306, and the resin member 50 was made of PPS.

The metal substrate 10 was degreased by dipping in a degreaser solution having a concentration of 5 g/L and a temperature of 75° C., allowing the metal substrate 10 to be ultrasonically cleaned, for 10 min.

The degreased metal substrate 10 was etched by dipping in a hydrochloric acid solution having a concentration of 200 g/L and a room temperature, allowing the metal substrate 10 to be etched for 5 min.

The etched metal substrate 10 was chemical etched by dipping in a hydrochloric acid solution having a concentration of 980 ml/L and a temperature of 120° C., allowing the metal substrate 10 to be chemical etched for 10 min.

The chemical etched metal substrate 10 was surface coupling treated by dipping in a coupling solution having a temperature of 40° C., allowing the metal substrate 10 to be surface coupling treated for 60 seconds to form an intermediate layer 30 on the metal substrate 10. The coupling solution includes water and zirconate coupling agent having a concentration of 20 ml/L.

The metal substrate 10 was dried in an oven having an interior temperature of 60° C. for 15 min.

Molten PPS resin having a temperature of 320° C. was injected to a surface of intermediate layer 30, and finally formed the resin member 50.

EXAMPLE 3

In this example, the metal substrate 10 was made of stainless steel SUS316, and the resin member 50 was made of PA.

The metal substrate 10 was degreased by dipping in a degreaser solution having a concentration of 15 g/L and a temperature of 60° C., allowing the metal substrate 10 to be ultrasonically cleaned, for 3 min.

The degreased metal substrate 10 was etched by dipping in a hydrochloric acid solution having a concentration of 150 g/L and a room temperature, allowing the metal substrate 10 to be etched for 3 min.

The etched metal substrate 10 was chemical etched by dipping in a sulphuric acid solution having a concentration of 900 ml/L and a temperature of 10° C., allowing the metal substrate 10 to be chemical etched for 120 min.

The chemical etched metal substrate 10 was surface coupling treated by dipping in a coupling solution having a temperature of 25° C., allowing the metal substrate 10 to be surface coupling treated for 15 seconds to form an intermediate layer 30 on the metal substrate 10. The coupling solution includes water and silane coupling agent having a concentration of 30 ml/L.

The metal substrate 10 was dried in an oven having an interior temperature of 120° C. for 5 min.

Molten PA resin having a temperature of 220° C. was injected to a surface of intermediate layer 30, and finally formed the resin member 50.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A metal-and-resin composite comprising:
   a metal substrate defining a plurality of nano pores;
   an intermediate layer formed on the metal substrate and filling a portion of each nano pore; and
   a resin member covering and bonding with the intermediate layer thus to bond with the metal substrate; and
   wherein a portion of each nano pore is unfilled with the intermediate layer, and the resin member fills the portion of each nano pore unfilled with the intermediate layer; a bonding between the resin member and the intermediate layer includes chemical bondings, such that the resin member bonds with the intermediate layer through the chemical bondings; and
   wherein the metal substrate is made of stainless steel, the intermediate layer is made by treating the metal substrate with a coupling solution having a silane compound coupling agent, the intermediate layer includes carbon having a mass percentage of about 2.58-2.87%, oxygen having a mass percentage of about 1.29-2.08%, silicon having a mass percentage of about 0.59-0.72%, chromium having a mass percentage of about 17.78-18.08%, manganese having a mass percentage of about 0.66-0.75%, iron having a mass percentage of about 67.73-69.23%, and nickel having a mass of about 7.79-7.88%.

2. The metal-and-resin composite of claim 1, wherein the nano pores have a diameter of about 10 nm to about 1000 nm, and a depth of about 0.1 μm to about 20 μm.

3. The metal-and-resin composite of claim 1, wherein the portion of each nano pore unfilled with the intermediate layer has a diameter of about 10 nm to about 990 nm.

4. The metal-and-resin composite of claim 1, wherein the resin member is made of polybutylene terephthalate, polyphenylene sulfide, polyethylene terephthalate, polyetheretherketone, polycarbonate, or polyvinyl chloride.

5. The metal-and-resin composite of claim 1, wherein the intermediate layer has a thickness of about 0.5 nm to about 10 nm.

\* \* \* \* \*

UNITED STATES PATENT AND TRADEMARK OFFICE
CERTIFICATE OF CORRECTION

PATENT NO. : 10,259,189 B2
APPLICATION NO. : 14/610154
DATED : April 16, 2019
INVENTOR(S) : Chwan-Hwa Chiang, Bao-Shen Zhang and Chieh-Hsiang Wang It is certified that error appears in the above-identified patent and that said Letters Patent is hereby corrected as shown below:

On the Title Page

Item (73) regarding "Assignees" should read:
(73) Assignees: SHENZHEN FUTAIHONG PRECISION INDUSTRY CO., LTD., Shenzhen (CN); FIH (HONG KONG) LIMITED, Kowloon (HK)

Signed and Sealed this
Fifteenth Day of September, 2020

Andrei Iancu
*Director of the United States Patent and Trademark Office*